United States Patent
Hong et al.

(10) Patent No.: US 11,945,888 B2
(45) Date of Patent: Apr. 2, 2024

(54) SOLUTION POLYMERIZATION PROCESS AND PRODUCT CONTROL USING EFFLUENT DENSITY

(71) Applicant: ExxonMobil Chemical Patents Inc., Baytown, TX (US)

(72) Inventors: Yifeng Hong, Houston, TX (US); Jay L. Reimers, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 689 days.

(21) Appl. No.: 16/847,736

(22) Filed: Apr. 14, 2020

(65) Prior Publication Data

US 2020/0362075 A1    Nov. 19, 2020

Related U.S. Application Data

(60) Provisional application No. 62/848,050, filed on May 15, 2019.

(51) Int. Cl.
| | |
|---|---|
| *C08F 210/16* | (2006.01) |
| *B01J 19/00* | (2006.01) |
| *B01J 19/06* | (2006.01) |
| *B01J 19/18* | (2006.01) |
| *C08F 2/04* | (2006.01) |

(52) U.S. Cl.
CPC ......... *C08F 210/16* (2013.01); *B01J 19/0066* (2013.01); *B01J 19/06* (2013.01); *B01J 19/1875* (2013.01)

(58) Field of Classification Search
None
See application file for complete search history.

(56) References Cited

U.S. PATENT DOCUMENTS 2,974,126 A      8/1955   Kelley
7,433,761 B2 *  10/2008   Battiste .................. B29C 48/92
                                                          264/408

FOREIGN PATENT DOCUMENTS

WO    WO 03/012399 A1 *  2/2003 ............... C08F 2/22
WO    2007/136493 A      11/2007
WO    2009/056461 A      5/2009

OTHER PUBLICATIONS

Machine translation of Detailed Description of WO 03/012399 A1, retrieved from ESPACENET on Feb. 21, 2002. (Year: 2003).*
Richards et al., "Measurement and control of polymerization reactors", Computers and Chemical Engineering, vol. 30, (2006), pp. 1447-1463.

* cited by examiner

*Primary Examiner* — Fred M Teskin

(57) ABSTRACT

A method for monitoring polymerization processes can include reacting by polymerization a feedstock in the presence of a catalyst in a reactor to produce an effluent comprising a polymer and a solvent; measuring a density of the effluent; and calculating a monomer conversion rate and/or a polymerization rate for the polymerization based on the density of the effluent. A system for monitoring polymerization processes can include a reactor containing an effluent comprising a solvent, a polymer, and a monomer; a flash vessel fluidly coupled to the reactor to receive the effluent from the reactor; and an inline density meter fluidly coupled to the reactor, placed between the reactor and the flash vessel, and configured to measure a density of the effluent.

32 Claims, 5 Drawing Sheets

SOLUTION POLYMERIZATION PROCESS AND PRODUCT CONTROL USING EFFLUENT DENSITY

CROSS-REFERENCE TO RELATED APPLICATIONS

This application claims priority to U.S.S.N. 62/848,050, filed May 15, 2019, herein incorporated by reference.

BACKGROUND

The present disclosure relates to methods and systems for monitoring polymerization processes.

Solution polymerization is one of many methods by which polymerization can be performed on an industrial scale. In solution polymerization processes, monomers are reacted with catalysts in the presence of a solvent, typically a solvent that does not react with the catalysts or monomers. The monomers and polymers resulting from the polymerization reaction are solubilized in a reactor by a solvent. Heat released by the reaction is absorbed by the solvent and removed by various methods, including but not limited to chilled feed, reflux cooling, cooling jacket, and external heat exchangers. The effluent exiting from the reactor is then further processed. Typically, the solvent and unreacted monomers are first flashed off (or volatilized) to separate the solvent and unreacted monomers from the polymer product in the concentration and devolatilization stages. Then, the polymers are extruded and pelletized to form small pellets, which are dried and bagged. Continuous stirred-tank reactor (CSTR) and loop reactor are examples of reactors that can be used in the solution polymerization process.

Polymerization rate impacts the design and control of the polymerization process. For example, the polymerization rate can be used to determine and adjust conditions of the polymerization process including pump speed, overhead condenser capability, and rate of pelletizer. Further, the polymer concentration in the solution in the reactor can be calculated from the polymerization rate. Polymer concentration is a parameter that impacts the design and control of the polymerization process. For example, the viscosity of the solution, which is dependent on the polymer concentration, impacts heat transfer and mixing. Accordingly, determining the polymerization rate of the solution polymerization process is of value to process operators.

Currently, a number of techniques has been developed to measure the polymerization rate in polymerization process. These techniques include measuring the pellets bagging rate or establishing a heat and mass balance model in the reactor. In the first technique, the rate of pellets bagging may be determined by calculating the number of bags filled with pellets at a certain weight produced per hour. The determination of the polymerization rate by using the rate of pellets bagging involves a time delay between the time the polymer is in the reactor and the time the polymer reaches the finishing section. The time delay in obtaining the polymerization rate measurement may result in an inaccurate extrapolation of the polymerization rate in the polymerization reaction solution. The time delay can be estimated based on the residence time of the polymer solution flowing through each vessel of the polymerization process. However, the time delay varies with the instantaneous flow rate and the vessel level, making it difficult to obtain accurate measurements. With respect to the second technique of establishing a heat and mass balance model in the reactor, accurate measurements of the heat loss and temperatures at different locations may also be difficult to obtain, in particular, in polymerization processes involving loop reactors, because loop reactors have a less thermally insulated body due to higher specific surface area as compared with CSTR.

The monomer conversion rate in the solution polymerization can be calculated based on the polymerization rate and the polymer chemical composition. The monomer conversion rate is a process variable that correlates with the weight average molecular weight of the polymers. When the reaction temperature is fixed, a higher monomer conversion rate results in a lower weight average molecular weight of the polymers. Adequate control of the monomer conversion rate, in particular in loop reactors, can avoid the depletion of monomers before the feed injection point and reduce the possible monomer concentration gradient that is created as the reaction continues along the loop, consuming monomers and thus resulting in the concentration decrease. A steep monomer concentration gradient usually results in a broader chemical composition distribution of products. However, adequately monitoring and controlling the monomer conversion rate is difficult due to the difficulty of obtaining an accurate polymerization rate.

Therefore, an appropriate method to calculate the polymerization rate and the monomer conversion rate that is simple, accurate, and has real-time response at the conditions of the solution polymerization processes is highly desirable.

SUMMARY OF THE INVENTION

This application relates generally to methods and systems for calculating polymerization rate and monomer conversion rate in a solution polymerization process using effluent density and monomer concentration in the feed.

The present disclosure includes methods comprising: reacting by polymerization a feedstock in the presence of a catalyst in a reactor to produce an effluent comprising a polymer and a solvent; measuring a density of the effluent; and calculating a monomer conversion rate and/or a polymerization rate for the polymerization based on the density of the effluent.

The present disclosure includes systems comprising: a reactor containing an effluent comprising a solvent, a polymer, and a monomer; a flash vessel fluidly coupled to the reactor to receive the effluent from the reactor; and an inline density meter fluidly coupled to the reactor, placed between the reactor and the flash vessel, and configured to measure a density of the effluent.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
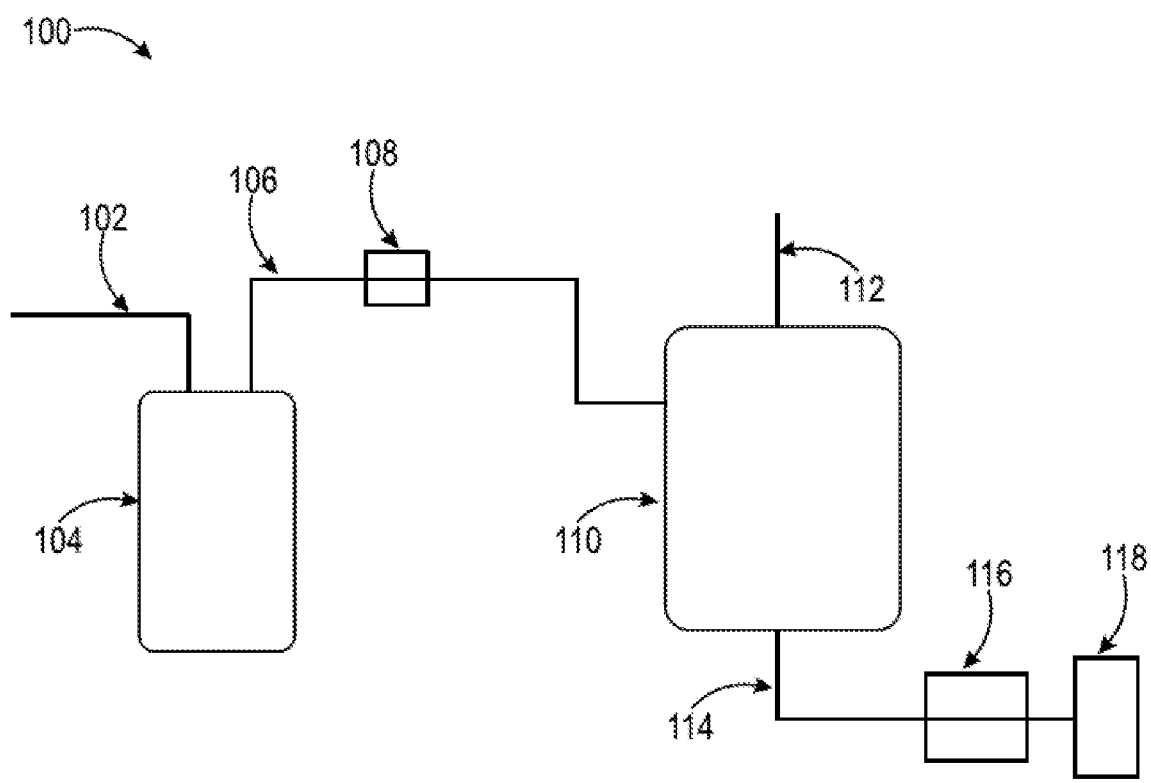
FIG. 1 illustrates a diagram of a system having a reactor for solution polymerization and an inline density meter placed after the reactor.

The present disclosure relates to methods and systems for calculating monomer conversion rate and polymerization rate in a solution polymerization process using the density measurement of the effluent exiting from the reactor. The present disclosure provides accurate and real-time methods and systems to extrapolate a property of the polymer (e.g., the molecular weight and/or melt flow rate of a polymer) from the calculated monomer conversion rate and polymerization rate. The present disclosure also provides methods and systems for modifying the molecular weight and melt flow rate of a polymer by changing a reaction condition (e.g., monomer concentration in the feedstock, monomer feed rate, reaction temperature, and/or catalyst feed rate to the reactor based on a correlation between the reaction condition, the density of the effluent, and the property of the polymer.

The effluent density in a solution polymerization process is dependent on the temperature and composition of the polymerization reaction. The reaction temperature is usually fixed within a narrow range, taking into account polymer tactility and molecular weight. When the temperature is fixed, the composition of the effluent governs the density. The major components of reactor effluent in the solution polymerization include a polymer, a solvent, and unreacted monomers. Generally, the density of the polymer is much higher than the density of the solvent while the density of the unreacted monomers is much lower than the density of the solvent. Since there is a conversion balance between polymers and monomers, a higher polymer concentration generally indicates lower levels of unreacted monomer in the effluent and also an increased effluent density. Therefore, if the total monomer concentration is fixed in the feedstock, the polymer concentration, and consequently the density of the effluent, can be controlled via altering the catalyst feed rate to the reactor.

The overall monomer conversion can also be adjusted by altering the total monomer concentration in the feed and the effluent density. When the feed monomer concentration and the reactor temperature are fixed, the effluent density is positively proportional to the monomer conversion rate. Moreover, since the molecular weight is also controlled by the monomer conversion rate, the density can then be used to control the molecular weight or melt flow rate in the reaction.

Definitions

As used herein, a "polymer" may be used to refer to homopolymers, copolymers, interpolymers, terpolymers, etc. When a polymer is referred to as comprising a monomer, the monomer is present in the polymer in the polymerized form of the monomer or in the derivative form of the monomer. Thus, when a polymer is said to comprise a certain percentage (e.g., wt of a monomer, that percentage of monomer is based on the total amount of monomer units in all the polymer components of the composition or blend. That is, a polymer comprising 30 wt % ethylene and 70 wt % propylene is a polymer where 30 wt % of the polymer is ethylene-derived units and 70 wt % of the polymer is propylene-derived units.

As used herein, "solution polymerization" refers to a polymerization process that takes place in the presence of a liquid polymerization system, such as an inert solvent or monomer(s) or their blends, in which the produced polymer dissolves. Solution polymerization comprises a homogeneous liquid polymerization system in the reactor. The temperature of a liquid polymerization system is below its supercritical or pseudo supercritical temperature, thus, solution polymerizations are performed below the supercritical temperature and/or pressure of the system.

As used herein, the "polymer concentration" is a weight percent of polymer relative to the solution mixture total weight.

As used herein, the "monomer concentration" is a weight percent of monomer relative to the solution mixture total weight.

As used herein, the "melt flow rate" is the ability of a polymer to flow in limited interval of time so that that polymer can be used in any standard machine, which has certain limitations based on flowability of polymer used. The melt flow rate of a polymer is calculated as the weight/10 min through melt flow testing machine at standard temperature.

As used herein, when describing components of a system that are fluidly coupled, the "fluid coupling" refers to fluids being able to travel from one component to the other or between components. When traversing a fluid coupling, the fluid may travel through hardware like lines, pipes, pumps, connectors, heat exchangers, and valves that ensure proper operation and safety measures when operating the system.

Polymerization Process

The methods of the present disclosure include reacting by polymerization a feedstock in the presence of a catalyst in a reactor to produce an effluent comprising a polymer; measuring a density of the effluent with an inline density meter; and calculating a monomer conversion rate and/or a polymerization rate for the polymerization based on the density of the effluent. The methods of the present disclosure also include calculating a property of the polymer in the effluent based on the density of the effluent, wherein the property of the polymer is selected from the group consisting of a molecular weight, a melt flow rate, and a combination thereof; and changing the property of the polymer by changing a reaction condition based on a correlation between the reaction condition, the density of the effluent, and the property of the polymer, wherein the reaction condition is selected from the group consisting of a monomer concentration in the feedstock, a monomer feed rate, a reaction temperature, a catalyst feed rate to the reactor, and any combination thereof.

In the methods of the present disclosure, a density measurement of the reactor effluent and reactor conditions including temperature and monomer concentration may be used to determine the chemical and physical properties of the polymer product including monomer conversion, polymer concentration, molecular weight, melt flow rate, and the like. The monomer conversion ($m_c$) can be extrapolated from the monomer concentration ($c_m$) and effluent density (d) according to Eq 1.

$$m_c = y_1 + a_1 c_m + b_1 d \qquad \text{Eq. 1}$$

where constants $a_1$ and $b_1$ and y-intercept parameter $y_i$ can be regressed from experimental data. The polymer concentration in the effluent can also be extrapolated from a conversion rate of the polymerization reaction. The polymer concentration ($c_p$) is predicted as a linear function of total monomer concentration ($c_m$) and effluent density (d) according to Eq 2.

$$c_p = y_2 + a_2 c_m + b_2 d \qquad \text{Eq. 2}$$

where constants $a_2$ and $b_2$ and y-intercept parameter $y_2$ can be regressed from experimental data. The polymer molecular weight ($M_w$) is predicted as a linear function of total monomer concentration ($c_m$) and effluent density (d) according to Eq 3.

$$M_w = y_3 + a_3 c_m + b_3 d \qquad \text{Eq. 3}$$

where constants $a_3$ and $b_3$ and y-intercept parameter $y_3$ can be regressed from experimental data. The melt flow rate (MFR) is predicted as a linear function of total monomer concentration ($c_m$)) and effluent density (d) according to Eq 4.

$$\text{MFR} = y_4 + a_4 c_m + b_4 d \qquad \text{Eq. 4}$$

where constants $a_4$ and $b_4$ and y-intercept parameter $y_4$ can be regressed from experimental data. The reactor conditions can then be adjusted to change the composition of the polymer product as desired. In the methods of the present disclosure, the feedstock and reaction processes may be used for predicting and/or changing the polymer product composition.

While the foregoing describes linear functions. Other functions may be used.

FIG. 1 illustrates a diagram of a system 100 of the present disclosure for calculating polymerization rate and monomer conversion rate in a solution polymerization process using effluent density and monomer concentration in the feed. A feedstock comprising a monomer and a solvent is introduced to a reactor 104 (e.g., a loop reactor or a stirred tank reactor) via a feedstock line 102. The feedstock can also comprise a catalyst. Alternatively (not illustrated), the catalyst can be introduced to the reactor 104 through a separate additional line. The monomer reacts with catalyst in the reactor to produce a polymer product that is solubilized by the solvent. An effluent exits the reactor 104 via line 106, and is conveyed to a flash vessel 110. The effluent of the reactor is a solution mixture. In the flash vessel 110, the solvent and unreacted monomer are volatilized and removed as overheads via overheads line 112. The polymer-rich bottoms of the flash vessel 110 are conveyed to a devolatilization unit 116 and/or a finishing unit 118 via bottom line 114. The system 100 further includes an inline density meter 108 downstream of the reactor 104. As illustrated, the inline density meter 108 is located along line 106 between the reactor 104 and the flash vessel 110.

Accordingly, a method of the present disclosure can comprise: reacting by polymerization a feedstock in the presence of a catalyst in a reactor 104, to produce an effluent comprising a polymer and a solvent, measuring a density of the effluent with an inline density meter 108; and calculating a monomer conversion rate and/or a polymerization rate for the polymerization based on the density of the effluent. The method of the present disclosure can further comprise calculating a property of the polymer in the effluent based on the density of the effluent, wherein the property of the polymer is selected from the group consisting of a molecular weight, a melt flow rate, and a combination thereof; and changing the property of the polymer by changing a reaction condition based on a correlation between the reaction condition, the density of the effluent, and the property of the polymer, wherein the reaction condition is selected from the group consisting of a monomer concentration in the feedstock, a reaction temperature, a catalyst feed rate to the reactor, and any combination thereof. In the method of the present disclosure, the monomer concentration in the feedstock can be in a range from about 20 wt % to about 60 wt %. In the method of the present disclosure, the reaction temperature can be in a range from about 50° C. to about 220° C. In the method of the present disclosure, the density of the effluent can be in a range from about 0.5 g/mL to about 0.7 g/mL. In the method of the present disclosure, a polymer concentration can be calculated from the polymerization rate. In the method of the present disclosure, the polymer concentration can be in a range from about 1 wt % to about 75 wt %. In the method of the present disclosure, the polymerization can be a solution polymerization. In the method of the present disclosure, the reactor can be a loop reactor. In the method of the present disclosure, the monomer can be selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. In the method of the present disclosure, the polymerization can be copolymerization. In the method of the present disclosure, the polymer is an ethylene-propylene copolymer. In the method of the present disclosure, the catalyst can be a metallocene catalyst.

Further, a system of the present disclosure can comprise: A system 100 comprising: a reactor 104 containing an effluent comprising a solvent, a polymer, and a monomer; a flash vessel 110 fluidly coupled to the reactor 104 to receive the effluent from the reactor 104; and an inline density meter 108 fluidly coupled to the reactor, placed between the reactor 104 and the flash vessel 110, and configured to measure a density of the effluent. In the system 100 of the present disclosure, the reactor 104 can be a loop reactor or a stirred tank reactor. The system 100 of the present disclosure can further comprise a devolatilization unit 116. The system 100 of the present disclosure can further comprise a finishing unit 118. In the system 100 of the present disclosure, the polymer can comprise a polyolefin. In the system 100 of the present disclosure, the monomer can be selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. In the system of the present disclosure, the polymer concentration can be in a range from about 1 wt % to about 75 wt %.

The solution polymerization process described herein may be carried out in any manner known in the art. The process may comprise polymerizing one or more monomers dissolved in a solvent as described herein in the presence of a catalyst system under conditions to obtain a first effluent comprising a solution of polyolefin, solvent, and, if present, unreacted monomer. The reactor effluent, which is a concentrated polymer solution, with a polymer weight fraction ranging from about 1 wt % to about 75 wt %, preferably about 2 wt % to about 50 wt %, preferably about 5 wt % to about 40 wt %, flows to the polymer concentration stage in a flash vessel or flash unit, in which the majority of unreacted monomers, comonomers and solvent are separated from the polymers. The polymer concentration stage can be accomplished by various methods, for example, vapor-liquid separation, liquid-liquid separation, or both. This stage can contain one or more separation vessels. A further devolatilization step will remove the residual volatiles from the polymers to reach the volatile requirement. In most cases, vacuum and continuous surface area renewal are used. The finishing step will pelletize the polymers into pellets suitable for shipping.

The polymerization process may be conducted under conditions including a temperature of about 50° C. to about 220° C., preferably about 70° C. to about 210° C., preferably about 90° C. to about 200° C., preferably about 100° C. to about 190° C., preferably about 130° C. to about 160° C. The polymerization process may be conducted at a pressure of from about 120 psi to about 1800 psi (about 12,411 kPa), preferably 200 psi to 1000 psi (about 1379 kPa to 6895 kPa), preferably 300 psi to 600 psi (about 2068 kPa to 4137 kPa). Preferably, the pressure is about 450 psi (about 3103 kPa).

Hydrogen may be present during the polymerization process at a partial pressure of 0.001 psig to 50 psig (0.007 kPa to 345 kPa), preferably 0.01 psig to 25 psig (0.07 kPa to 172 kPa), preferably 0.1 psig to 10 psig (0.7 kPa to 70 kPa).

Catalyst System

Catalyst systems suitable for use in conjunction with the methods and systems of the present invention can preferably comprise metallocene catalysts and other single site catalysts because these catalysts generally produce polymers with narrow molecular weight distribution. The PDI values for polymers made with metallocene catalyst systems in homogeneous polymerization media are typically close to the statistically expected value of 2.0. However, any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, New York, 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. Patent Application Publication No. 2008/0153997, each of which is herein incorporated by reference.

Activators and associated activation methods can be used in a catalyst system. Examples of activators include, but are not limited to, aluminoxane and aluminum alkyl activators, ionizing activators, and nonionizing activators.

Examples of aluminoxane and aluminum alkyl activators and associated methods can be found in U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, and 5,103,031; European Patent and Application Publication Nos. EP 0 561 476 A1, EP 0 279 586 B1, EP 0 516 476 A, and EP 0 594 218 A1; and PCT Patent Publications No. WO 94/10180, which are each incorporated herein by reference.

Examples of ionizing activators and associated methods can be found in European Patent and Application Publication Nos. EP 0 570 982 A, EP 0 520 732 A, EP 0 495 375 A, EP 0 500 944 B 1, EP 0 277 003 A and EP 0 277 004 A; and U.S. Pat. Nos. 5,153,157, 5,198,401, 5,066,741, 5,206, 197, 5,241,025, 5,384,299, and 5,502,124.

Examples of nonionizing activators and associated methods can be found in E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Monomers

Any monomer having one or more non-conjugated aliphatic double bond(s) and two or more carbon atoms may be used. Examples of monomers include, but are not limited to, α-olefins (e.g., ethylene, propylene, butene-1, hexene-1, octene-1, decene-1, and dodecene-1), substituted olefins (e.g., styrene, paramethylstyrene, and vinylcyclohexane), non-conjugated dienes (e.g., vinylcyclohexene), α,ω-dienes (e.g., 1,5-hexadiene and 1,7-octadiene), cycloolefins (e.g., cyclopentene, cyclohexene, and cyclohexadiene), norbornene, and the like, and any combination thereof.

Olefin monomer or monomers can be used. Advantageous monomers include $C_2$ to $C_{100}$ olefins, advantageously $C_2$ to $C_{60}$ olefins, advantageously $C_3$ to $C_{40}$ olefins advantageously $C_3$ to $C_{20}$ olefins, advantageously $C_3$ to $C_{12}$ olefins. Monomers can include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers can be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

Aromatic-group-containing monomers containing up to 30 carbon atoms can be used. Suitable aromatic-group-containing monomers comprise at least one aromatic structure, advantageously from one to three, more advantageously a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to $C_1$ to $C_{10}$ alkyl groups. Additionally two adjacent substitutions can be joined to form a ring structure. Advantageous aromatic-group-containing monomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

Non-aromatic cyclic group containing monomers can be used. These monomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, and the like.

Diolefin monomer(s) can be used. Advantageous diolefin monomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers (e.g., divinyl monomers). More advantageously, the diolefin monomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (weight average molecular weight less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Example Embodiments

A first example embodiment is a method comprising: reacting by polymerization a feedstock in the presence of a catalyst in a reactor to produce an effluent comprising a polymer and a solvent; measuring a density of the effluent; and calculating a monomer conversion rate and/or a polymerization rate for the polymerization based on the density of the effluent. Optionally this method can further include one or more of the following: Element 1: further comprising calculating a property of the polymer in the effluent based on the density of the effluent, wherein the property of the polymer is selected from the group consisting of a molecular weight, a melt flow rate, and a combination thereof; and changing the property of the polymer by changing a reaction condition based on a correlation between the reaction condition, the density of the effluent, and the property of the polymer, wherein the reaction condition is selected from the group consisting of a monomer concentration in the feedstock, a reaction temperature, a catalyst feed rate to the reactor, and any combination thereof; Element 2: wherein the monomer concentration in the feedstock is in a range from about 20 wt % to about 60 wt %; Element 3: wherein the reaction temperature is in a range from about 50° C. to 220° C.; Element 4: wherein the density of the effluent is in a range from about 0.5 g/mL to 0.7 g/mL; Element 5: wherein a polymer concentration is calculated from the polymerization rate; Element 6: wherein the polymer concentration is in a range from about 1 wt % to about 75 wt %; Element 7: wherein the polymerization is a solution polymerization; Element 8: wherein the reactor is a loop reactor; Element 9: wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 10: wherein the polymerization is a copolymerization; Element 11: wherein the polymer is an ethylene-propylene copolymer; Element 12: wherein the catalyst is a metallocene catalyst. Examples of combinations of the foregoing include, but are not limited to, Element 1 in combination with one or more of Elements 2 and 3 and optionally in further combination with one or more of Elements 4-12; Element 1 in combination with Element 2 and optionally in further combination with one or more of Element 4-12; Element 1 in combination with Elements 2 and 3 and optionally in further combination with Element 4; Element 1 in combination with Element 4 and optionally in further combination with Element 5; Element 1 in combination with Element 6 and optionally in further combination with Element 7; Element 1 in combination with one or more of Elements 8-12; Element 1 in combination with one or more of Elements 2 and 3 and two or more of Elements 4-12.

A second example embodiment is a system comprising: a reactor containing an effluent comprising a solvent, a polymer, and a monomer; a flash vessel fluidly coupled to the reactor to receive the effluent from the reactor; and an inline density meter fluidly coupled to the reactor, placed between the reactor and the flash vessel, and configured to measure a density of the effluent. Optionally this system can further include one or more of the following: Element 6; Element 8; Element 9; Element 13: wherein the reactor is a stirred tank reactor; Element 14: further comprising a devolatilization unit placed after the flash vessel; Element 15: further comprising a finishing unit placed after the devolatilization unit; Element 16: wherein the polymer comprises a polyolefin. Examples of combinations of the foregoing include, but are not limited to, Element 6 in combination with Element 8; Element 6 in combination with Element 9 optionally in further combination with one or more of Elements 13 and 16 and optionally in further combination with Element 14; Element 6 in combination with Element 14 and optionally in further combination with Element 15; Element 9 in combination with Elements 14 and 15 and optionally in further combination with Element 16.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While the methods are described herein in terms of "comprising" various components or steps, the methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. A solution polymerization reaction in a loop reactor was simulated with various total monomer concentrations and specific effluent densities (cases 1-252). The simulation software in this example was Aspen Plus version 8.8 with Aspen Polymer Module implemented. The thermodynamic method was based on Perturbed-Chain Statistical Association Fluid Theory (PC-SAFT). The required material properties were directly obtained from the property data banks implemented in Aspen Plus.

A loop reactor was used in the simulation. One heat exchanger was connected via pipes in a loop. A pump was placed at the bottom of the loop to drive recycle of the reactants, solvent and catalyst/activator. Plug flow reactor in Aspen was used to simulate the heat exchangers and pipes in the loop reactor. The heat exchanger was set to be in isothermal mode while the pipes were treated adiabatically.

The reaction simulated in Example 1 was a copolymerization of ethylene and propylene. Copolymerization kinetics were obtained from the literature and implemented in the simulator. Therefore, both heat and mass balance and polymer properties, including chemical composition and molecular weight distribution could be accurately modeled. Metallocene catalyst was used in the system. The reaction temperature tested was 63° C. The total monomer concentration and effluent density were varied according to the ranges operated in the actual pilot scale solution loop reactors, where the total monomer concentration was varied from about 26 wt % to about 41 wt % and the effluent density was varied from about 0.59 to about 0.61.

Figure 2A:
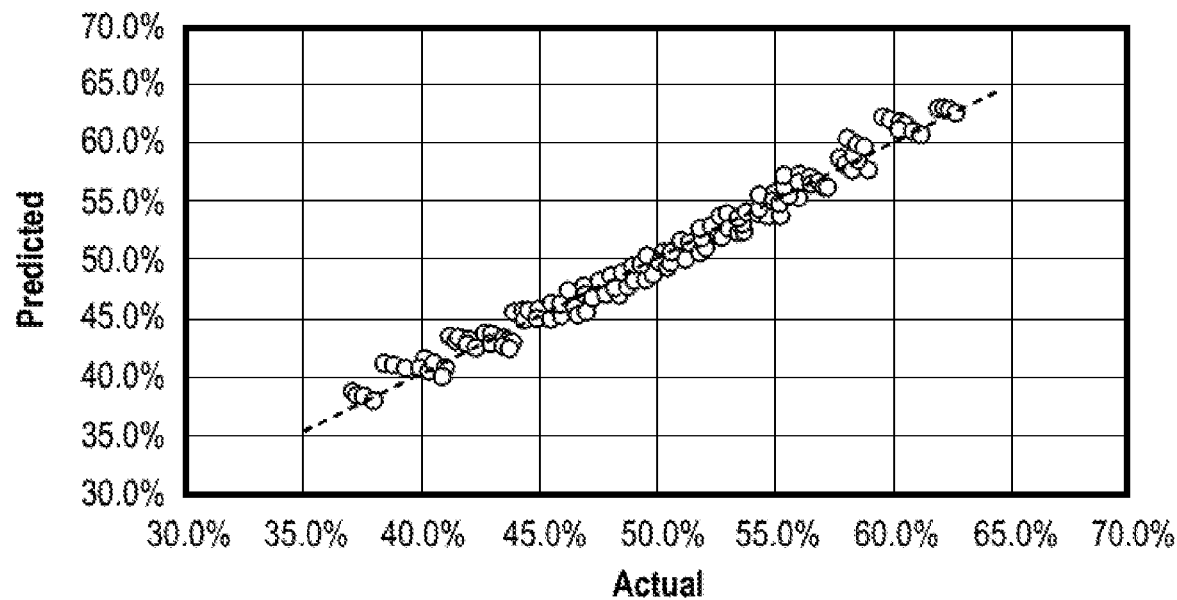
FIG. 2A is a graph showing the predicted overall monomer conversion rate as a function of the actual monomer conversion rate in the polymerization process of Example 1.
Figure 2B:
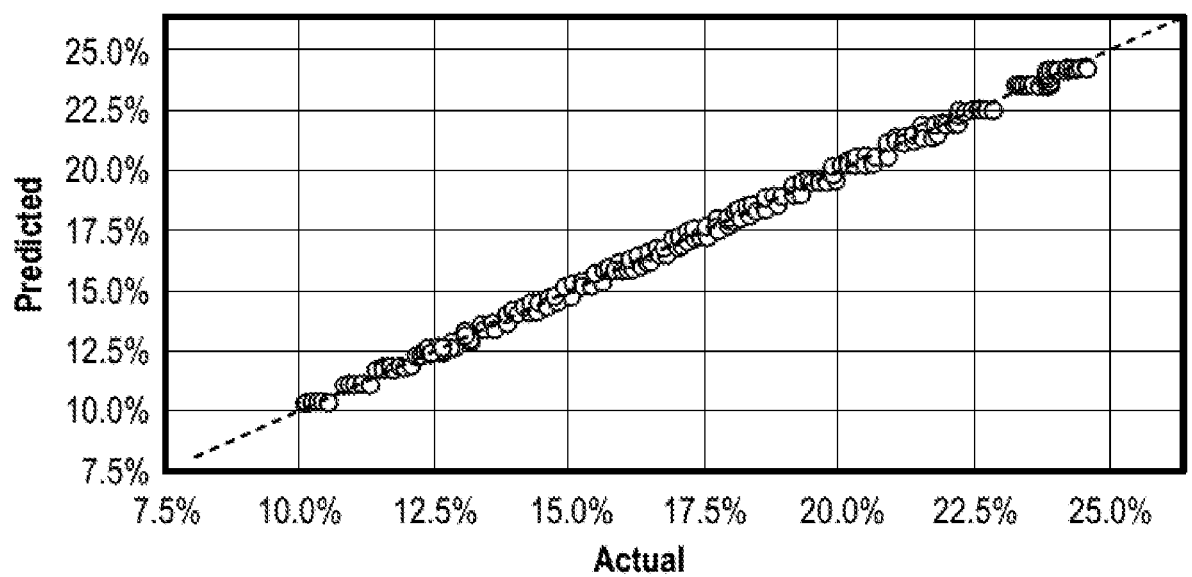
FIG. 2B is a graph showing the predicted concentration of polymer in solution as a function of the actual concentration of polymer in solution in the polymerization process of Example 1.
Figure 2C:
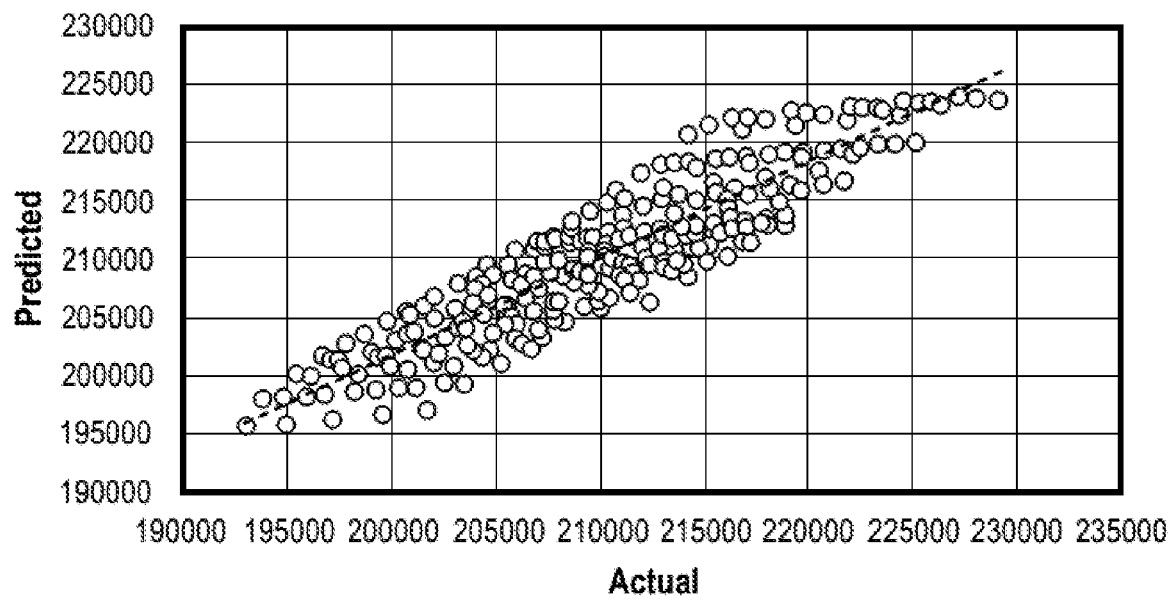
FIG. 2C is a graph showing the predicted average molecular weight Mw of the polymer as a function of the actual average molecular weight Mw of the polymer in the polymerization process of Example 1.
Figure 2D:
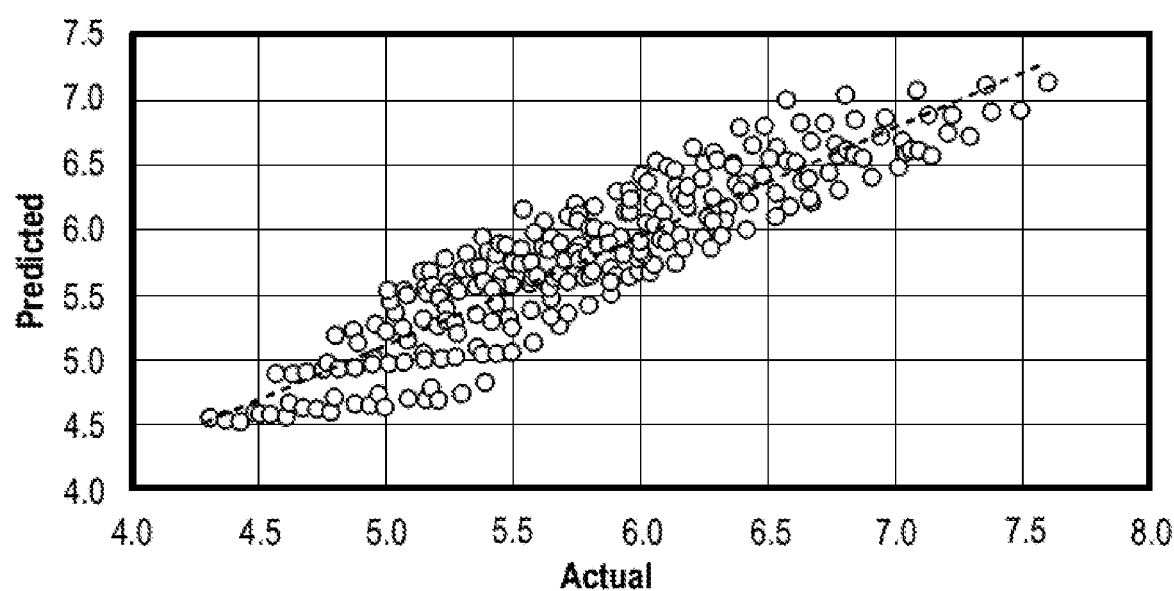
FIG. 2D is a graph showing the predicted melt flow rate of the polymer as a function of the actual melt flow rate of the polymer in the polymerization process of Example 1.

The actual and predicted overall conversion, polymer concentration, weight average Mw, and melt flow rate of the polymerization process were calculated. The actual data are derived from first principle model, which has intrinsic polymerization kinetics. The predicted data are linear regression of the actual data. The variables are effluent density and overall monomer concentration. FIG. 2A shows the predicted overall monomer conversion rate as a function of the actual monomer conversion rate. FIG. 2B shows the predicted concentration of polymer in solution as a function of the actual concentration of polymer. FIG. 2C shows the predicted weight average molecular weight Mw of the polymer as a function of the actual weight average molecular weight Mw of the polymer. FIG. 2D shows the predicted melt flow rate of the polymer as a function of the actual melt flow rate of the polymer. Multivariable linear regression with the total monomer concentration and effluent density as variables has been applied to fit the overall monomer conversion rate, polymer concentration, weight average molecular weight and melt flow rate.

Table 1 represents a summary of regression model parameters $y_i$, $a_i$, and $b_i$ (i=1-4) (see Eqs. 1-4) and R Square for the cases of Example 1.

TABLE 1

| | Monomer Conversion i = 1 (FIG. 2A) | Polymer Concentration i = 2 (FIG. 2B) | Weight Avg. MW i = 3 (FIG. 2C) | Melt Flow Rate i = 4 (FIG. 2D) |
|---|---|---|---|---|
| $y_i$ | −5.72 | −2.08 | 9.97 × 10$^5$ | −6.68 × 10$^1$ |
| $a_i$ | 4.83 × 10$^{-1}$ | 6.59 × 10$^{-1}$ | 8.94.10$^4$ | −8.12 |
| $b_i$ | 9.99 | 3.35 | −1.34.10$^6$ | 1.23 × 10$^2$ |
| R Square | 0.981 | 0.998 | 0.836 | 0.827 |

Table 2 represents the regression statistics, standard errors, and analysis of variance (degrees of freedom (df) and sum of squares (SS)) for the monomer conversion regression calculations shown in FIG. 2A.

TABLE 2

| | Regression statistics |
|---|---|
| Multiple R | 0.991 |
| R Square | 0.981 |
| Adjusted R Square | 0.981 |
| Standard Error | 0.00812 |
| Observations | 252 |
| | Standard Error |
| Intercept $y_1$ | 0.0618 |
| $a_1$ | 0.0132 |
| $b_1$ | 0.103 |

| Analysis of variance | | |
|---|---|---|
| | df | SS |
| Regression | 2 | 0.860 |
| Residual | 249 | 0.0164 |
| Total | 251 | 0.876 |

Table 3 represents the regression statistics, standard errors, and analysis of variance (degrees of freedom (df) and sum of squares (SS)) for the monomer conversion regression calculations shown in FIG. 2B.

TABLE 3

| | Regression statistics |
|---|---|
| Multiple R | 0.999 |
| R Square | 0.998 |
| Adjusted R Square | 0.998 |
| Standard Error | 0.00247 |
| Observations | 252 |
| | Standard Error |
| Intercept $y_2$ | 0.0129 |
| $a_2$ | 0.00275 |
| $b_2$ | 0.0217 |

| Analysis of variance | | |
|---|---|---|
| | df | SS |
| Regression | 2 | 0.301 |
| Residual | 249 | 0.000720 |
| Total | 251 | 0.302 |

Table 4 represents the regression statistics, standard errors, and analysis of variance (degrees of freedom (df) and sum of squares (SS)) for the monomer conversion regression calculations shown in FIG. 2C.

TABLE 4

| | Regression statistics |
|---|---|
| Multiple R | 0.914 |
| R Square | 0.836 |
| Adjusted R Square | 0.835 |
| Standard Error | $3.10 \times 10^3$ |
| Observations | 252 |
| | Standard Error |
| Intercept $y_3$ | $2.36 \times 10^4$ |
| $a_3$ | $5.02 \times 10^3$ |
| $b_3$ | $3.95 \times 10^4$ |

TABLE 4 (Continued)

| Analysis of variance | | |
|---|---|---|
| | df | SS |
| Regression | 2 | $1.22 \times 10^{10}$ |
| Residual | 249 | $2.39 \times 10^9$ |
| Total | 251 | $1.46.10^{10}$ |

Table 5 represents the regression statistics, standard errors, and analysis of variance (degrees of freedom (df) and sum of squares (SS)) for the monomer conversion regression calculations shown in FIG. 2D.

TABLE 5

| | Regression Statistics |
|---|---|
| Multiple R | 0.910 |
| R Square | 0.827 |
| Adjusted R Square | 0.826 |
| Standard Error | 0.290 |
| Observations | 252 |
| | Standard Error |
| Intercept $y_4$ | 2.21 |
| $a_4$ | 0.470 |
| $b_4$ | 3.699 |

| Analysis of variance | | |
|---|---|---|
| | df | SS |
| Regression | 2 | 101 |
| Residual | 249 | 21.0 |
| Total | 251 | 122 |

This example illustrates that the overall monomer conversion rate and polymer concentration can be well fitted by the regression model with $R^2=0.981$ and 0.998, respectively. The weight average molecular weight and melt flow rate can also be reasonably extrapolated from the monomer conversion rate and polymer concentration.

Example 2. The solution polymerization reaction of Example 1 was simulated with various total monomer concentrations and specific effluent densities (cases 1-126) at 93° C., where the total monomer concentration was varied from about 30 wt % to about 40 wt % and the effluent density was varied from about 0.57 to about 0.60.

Figure 3A:
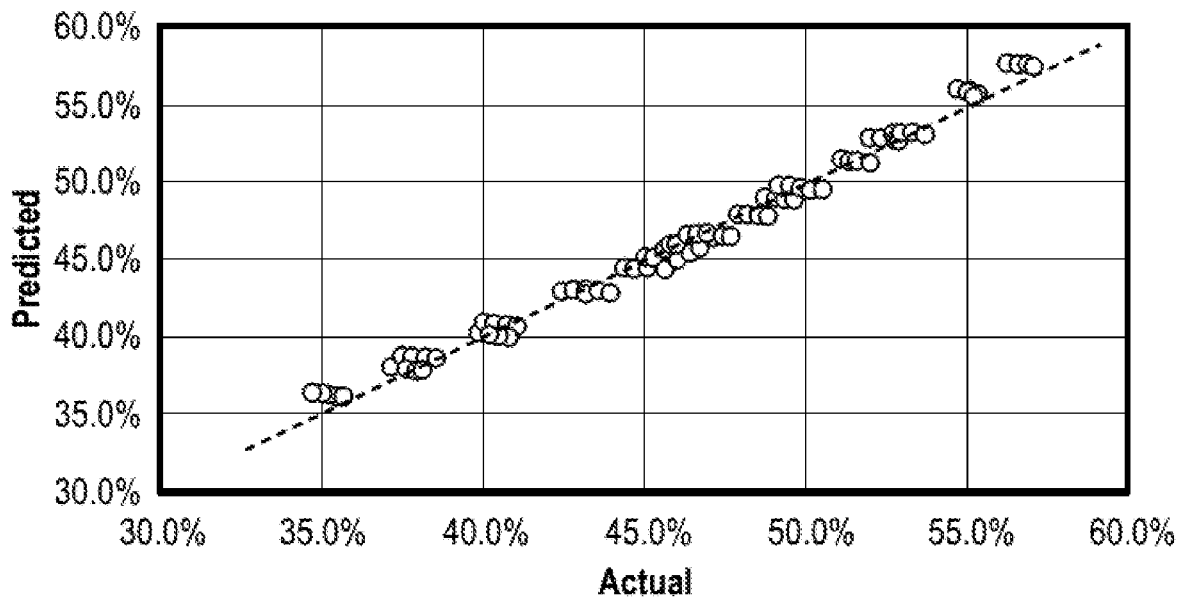
FIG. 3A is a graph showing the predicted overall monomer conversion rate as a function of the actual monomer conversion rate in the polymerization process of Example 2.
Figure 3B:
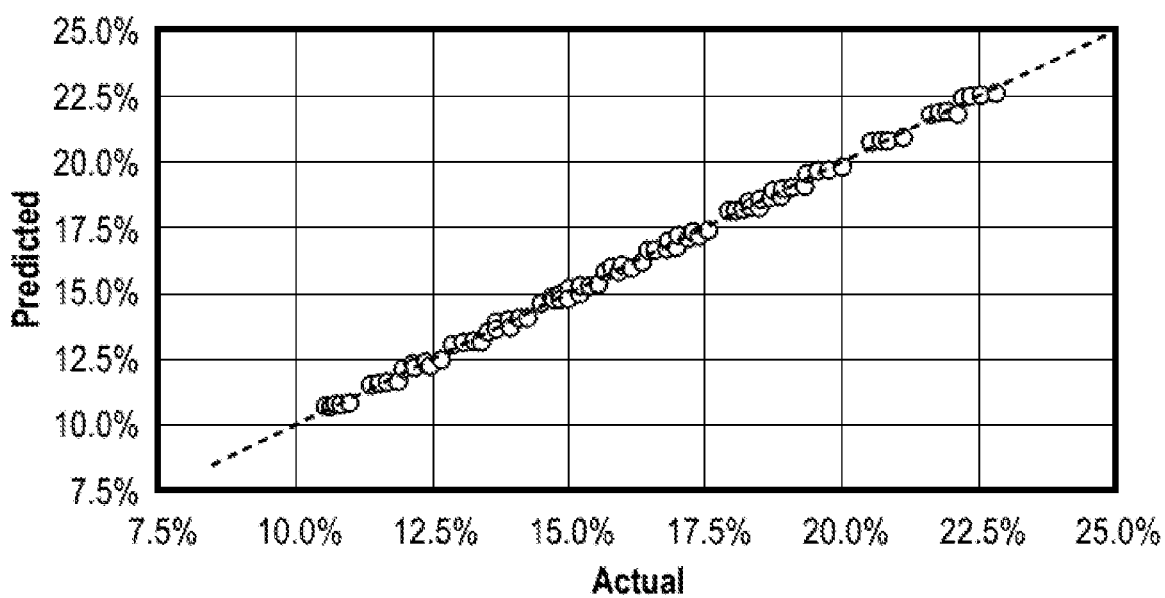
FIG. 3B is a graph showing the predicted concentration of polymer in solution as a function of the actual concentration of polymer in solution in the polymerization process of Example 2.
Figure 3C:
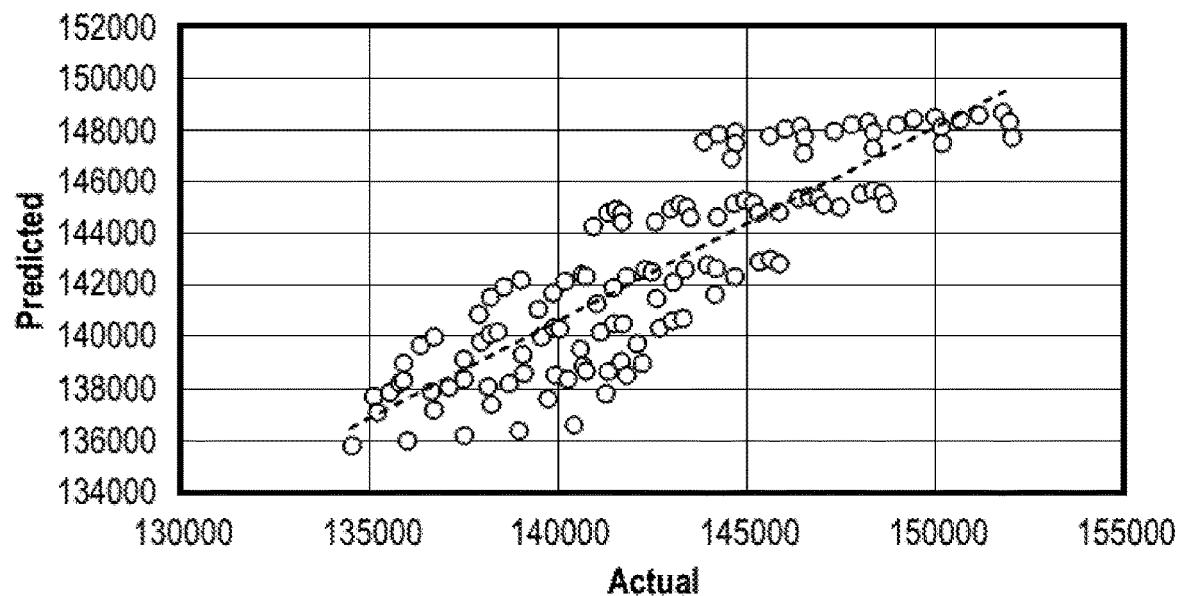
FIG. 3C is a graph showing the predicted average molecular weight Mw of the polymer as a function of the actual average molecular weight Mw of the polymer in the polymerization process of Example 2.
Figure 3D:
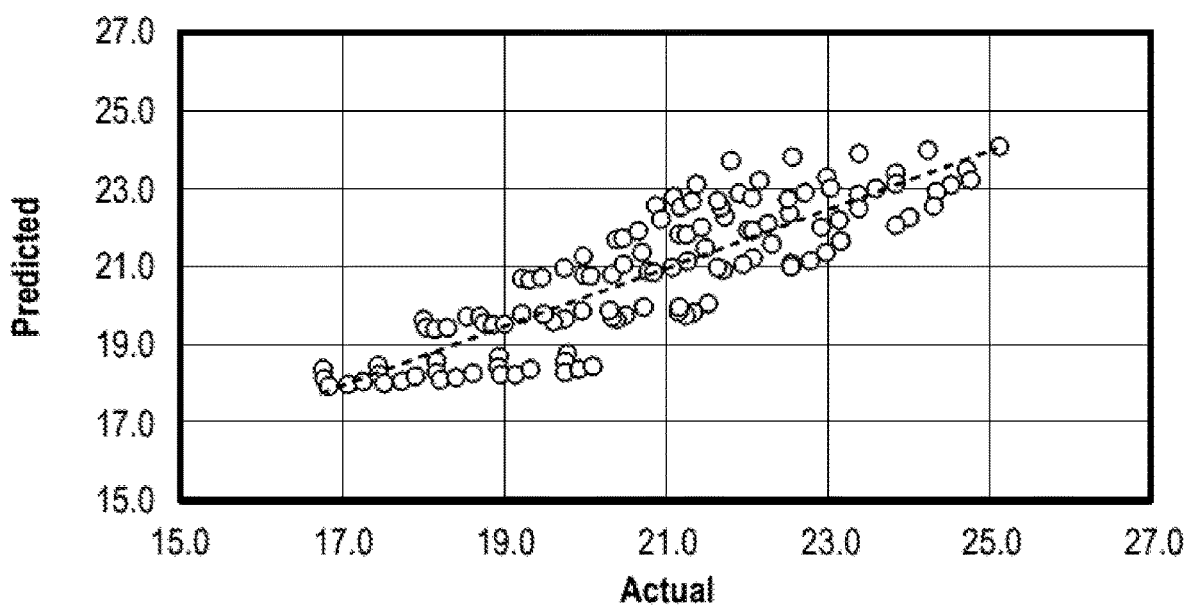
FIG. 3D is a graph showing the predicted melt flow rate of the polymer as a function of the actual melt flow rate of the polymer in the polymerization process of Example 2.

The actual and predicted overall conversion, polymer concentration, weight average Mw, and melt flow rate of the polymerization process were calculated. FIG. 3A shows the predicted overall monomer conversion rate as a function of the actual monomer conversion rate. FIG. 3B shows the predicted concentration of polymer in solution as a function of the actual concentration of polymer. FIG. 3C shows the predicted weight average molecular weight Mw of the polymer as a function of the actual weight average molecular weight Mw of the polymer. FIG. 3D shows the predicted melt flow rate of the polymer as a function of the actual melt flow rate of the polymer. Multivariable linear regression with the total monomer concentration and effluent density as variables has been applied to fit the overall monomer conversion rate, polymer concentration, weight average molecular weight and melt flow rate.

Table 6 represents a summary of regression model parameters $y_i$, $a_i$, and $b_i$ (i=1-4) (see Eqs. 1-4) and R Square for the cases of Example 2.

TABLE 6

|  | Monomer Conversion i = 1 (FIG. 3A) | Polymer Concentration i = 2 (FIG. 3B) | Weight Avg. MW i = 3 (FIG. 3C) | Melt Flow Rate i = 4 (FIG. 3D) |
|---|---|---|---|---|
| $y_i$ | −4.77 | −1.85 | $6.55 \times 10^5$ | $-2.24 \times 10^2$ |
| $a_i$ | $5.31 \times 10^1$ | 0.646 | $6.91 \times 10^4$ | $-3.38 \times 10^1$ |
| $b_i$ | 8.66 | 3.07 | $-9.21 \times 10^5$ | $4.39 \; 10^2$ |
| R Square | 0.988 | 0.998 | 0.751 | 0.748 |

Table 7 represents the regression statistics, standard errors, and analysis of variance (degrees of freedom (df) and sum of squares (SS)) for the monomer conversion regression calculations shown in FIG. 3A.

TABLE 7

|  | Regression statistics |
|---|---|
| Multiple R | 0.994 |
| R Square | 0.988 |
| Adjusted R Square | 0.987 |
| Standard Error | 0.00614 |
| Observations | 126 |
|  | Standard Error |
| Intercept $y_1$ | 0.0762 |
| $a_1$ | 0.0207 |
| $b_1$ | 0.138 |

Analysis of variance

|  | df | SS |
|---|---|---|
| Regression | 2 | 0.369 |
| Residual | 123 | 0.00463 |
| Total | 125 | 0.374 |

Table 8 represents the regression statistics, standard errors, and analysis of variance (degrees of freedom (df) and sum of squares (SS)) for the monomer conversion regression calculations shown in FIG. 3B.

TABLE 8

|  | Regression statistics |
|---|---|
| Multiple R | 0.999 |
| R Square | 0.998 |
| Adjusted R Square | 0.998 |
| Standard Error | 0.00137 |
| Observations | 126 |
|  | Standard Error |
| Intercept $y_2$ | 0.0170 |
| $a_2$ | 0.00461 |
| $b_2$ | 0.0306 |

TABLE 8
(Continued)
Analysis of variance

|  | df | SS |
|---|---|---|
| Regression | 2 | 0.130 |
| Residual | 123 | 0.000230 |
| Total | 125 | 0.130 |

Table 9 represents the regression statistics, standard errors, and analysis of variance (degrees of freedom (df) and sum of squares (SS)) for the monomer conversion regression calculations shown in FIG. 3C.

TABLE 9

|  | Regression statistics |
|---|---|
| Multiple R | 0.867 |
| R Square | 0.751 |
| Adjusted R Square | 0.747 |
| Standard Error | $2.14 \times 10^3$ |
| Observations | 126 |
|  | Standard Error |
| Intercept $y_3$ | $2.66 \times 10^4$ |
| $a_3$ | $7.22 \times 10^4$ |
| $b_3$ | $4.80 \times 10^4$ |

Analysis of variance

|  | df | SS |
|---|---|---|
| Regression | 2 | $1.70 \times 10^9$ |
| Residual | 123 | $5.64 \times 10^5$ |
| Total | 125 | $2.26 \times 10^9$ |

Table 10 represents the regression statistics, standard errors, and analysis of variance (degrees of freedom (df) and sum of squares (SS)) for the monomer conversion regression calculations shown in FIG. 3D.

TABLE 10

|  | Regression Statistics |
|---|---|
| Multiple R | 0.865 |
| R Square | 0.748 |
| Adjusted R Square | 0.744 |

TABLE 10-continued

|  | Standard Error |
| --- | --- |
| Intercept $y_4$ | 12.8 |
| $a_4$ | 3.48 |
| $b_4$ | 23.1 |

Analysis of variance

|  | df | SS |
| --- | --- | --- |
| Regression | 2 | 389 |
| Residual | 123 | 131 |
| Total | 125 | 520 |

This example illustrates that the overall monomer conversion rate and polymer concentration can be well fitted by the regression model with $R^2$=0988 and 0.998, respectively. The weight average molecular weight and melt flow rate can also be reasonably extrapolated from the monomer conversion rate and polymer concentration.

The total monomer concentration may also be fixed and the effluent density may be the only knob to control the overall conversion rate of monomer, polymer concentration, and melt flow rate, making it a simple and real-time method for polymerization process control. The density can be controlled in multiple ways including by altering the catalyst rate and heat removal duty of the heat exchanger.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising
reacting by polymerization a feedstock in the presence of a metallocene catalyst in a reactor to produce an effluent comprising a polymer and a solvent;
measuring a density of the effluent; and
calculating a monomer conversion rate and/or a polymerization rate for the polymerization based on the density of the effluent.

2. The method of claim 1 further comprising:
calculating a property of the polymer in the effluent based on the density of the effluent, wherein the property of the polymer is selected from the group consisting of a molecular weight, a melt flow rate, and a combination thereof; and
changing the property of the polymer by changing a reaction condition based on a correlation between the reaction condition, the density of the effluent, and the property of the polymer, wherein the reaction condition is selected from the group consisting of a monomer concentration in the feedstock, a reaction temperature, a catalyst feed rate to the reactor, and any combination thereof.

3. The method of claim 2, wherein the monomer concentration in the feedstock is in a range from about 20 wt % to about 60 wt %.

4. The method of claim 2, wherein the reaction temperature is in a range from about 50° C. to about 220° C.

5. The method of claim 1, wherein the density of the effluent is in a range from about 0.5 g/mL to about 0.7 g/mL.

6. The method of claim 1, wherein a polymer concentration is calculated from the polymerization rate.

7. The method of claim 1, wherein the polymer concentration is in a range from about 1 wt % to about 75 wt %.

8. The method of claim 1, wherein the polymerization is a solution polymerization.

9. The method of claim 1, wherein the reactor is a loop reactor.

10. The method of claim 1, wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

11. The method of claim 1, wherein the polymerization is a copolymerization.

12. The method of claim 1, wherein the polymer is an ethylene-propylene copolymer.

13. A method comprising
reacting by polymerization a feedstock in the presence of a catalyst in a reactor to produce an effluent comprising a polymer and a solvent;
measuring a density of the effluent;
calculating a monomer conversion rate and/or a polymerization rate for the polymerization based on the density of the effluent;

calculating a property of the polymer in the effluent based on the density of the effluent, wherein the property of the polymer is selected from the group consisting of a molecular weight, a melt flow rate, and a combination thereof; and changing the property of the polymer by changing a reaction condition based on a correlation between the reaction condition, the density of the effluent, and the property of the polymer, wherein the reaction condition is selected from the group consisting of a monomer concentration in the feedstock, a reaction temperature, a catalyst feed rate to the reactor, and any combination thereof.

14. The method of claim 13, wherein the monomer concentration in the feedstock is in a range from about 20 wt % to about 60 wt %.

15. The method of claim 13, wherein the reaction temperature is in a range from about 50° C. to about 220° C.

16. The method of claim 13, wherein the density of the effluent is in a range from about 0.5 g/mL to about 0.7 g/mL.

17. The method of claim 13, wherein a polymer concentration is calculated from the polymerization rate.

18. The method of claim 13, wherein the polymer concentration is in a range from about 1 wt % to about 75 wt %.

19. The method of claim 13, wherein the polymerization is a solution polymerization and the reactor is a loop reactor.

20. The method of claim 13, wherein the polymer is an ethylene-propylene copolymer.

21. The method of claim 13, wherein the catalyst is a metallocene catalyst.

22. The method of claim 13, wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

23. A method comprising
reacting by polymerization a feedstock in the presence of a catalyst in a reactor to produce an effluent comprising a polymer and a solvent;
measuring a density of the effluent; and
calculating a monomer conversion rate and/or a polymerization rate for the polymerization based on the density of the effluent, wherein the polymer is an ethylene-propylene copolymer.

24. The method of claim 23 further comprising:
calculating a property of the polymer in the effluent based on the density of the effluent, wherein the property of the polymer is selected from the group consisting of a molecular weight, a melt flow rate, and a combination thereof; and changing the property of the polymer by changing a reaction condition based on a correlation between the reaction condition, the density of the effluent, and the property of the polymer, wherein the reaction condition is selected from the group consisting of a monomer concentration in the feedstock, a reaction temperature, a catalyst feed rate to the reactor, and any combination thereof.

25. The method of claim 24, wherein the monomer concentration in the feedstock is in a range from about 20 wt % to about 60 wt %.

26. The method of claim 24, wherein the reaction temperature is in a range from about 50° C. to about 220° C.

27. The method of claim 23, wherein the density of the effluent is in a range from about 0.5 g/mL to about 0.7 g/mL.

28. The method of claim 23, wherein a polymer concentration is calculated from the polymerization rate.

29. The method of claim 23, wherein the polymer concentration is in a range from about 1 wt % to about 75 wt %.

30. The method of claim 23, wherein the polymerization is a solution polymerization.

31. The method of claim 23, wherein the polymerization is a copolymerization.

32. The method of claim 23, wherein the catalyst is a metallocene catalyst.

* * * * *